United States Patent
Certain

Patent Number: 6,140,720
Date of Patent: Oct. 31, 2000

[54] DEVICE FOR THERMALLY PROTECTING ELASTOMERIC COMPONENTS, SYSTEM OF SUCH DEVICES FOR THE PROTECTION OF A ROTORCRAFT ROTOR IN COLD WEATHER, AND ROTORCRAFT ROTOR EQUIPPED WITH SUCH A SYSTEM

[75] Inventor: Nicolas Pierre Georges Certain, Aix-en-Provence, France

[73] Assignee: Eurocopter, France

[21] Appl. No.: 09/114,629

[22] Filed: Jul. 13, 1998

[30] Foreign Application Priority Data

Jul. 15, 1997 [FR] France ................................. 97 08951

[51] Int. Cl.[7] ............................... H02K 1/32; H02K 3/24
[52] U.S. Cl. ................................. 310/64; 310/43; 310/65; 310/85; 310/88; 310/89; 310/91

[56] References Cited

U.S. PATENT DOCUMENTS

| | | |
|---|---|---|
| 3,765,267 | 10/1973 | Bourquardez et al. ................... 74/581 |
| 4,269,570 | 5/1981 | Rao ............................................. 417/64 |
| 4,315,343 | 2/1982 | Neroda et al. ............................. 310/89 |
| 4,357,057 | 11/1982 | Peterson et al. ......................... 416/140 |
| 4,645,421 | 2/1987 | Huether ..................................... 416/92 |
| 4,664,600 | 5/1987 | Perry ........................................ 416/224 |
| 4,822,245 | 4/1989 | Aubry et al. ............................. 416/134 |
| 4,915,585 | 4/1990 | Guimbal .................................. 416/140 |
| 5,267,833 | 12/1993 | Mouille ................................... 416/140 |

*Primary Examiner*—Elvin Enad
*Attorney, Agent, or Firm*—Piper Marbury Rudnick & Wolfe

[57] ABSTRACT

The thermal protection device comprises, for at least one elastomeric component of a rotor, at least one element which is fitted onto the rotor so as to reduce heat exchange between the elastomeric component and the ambient air. The element may be thermally insulating and may include at least one layer of a thermal insulation material and means for fitting it onto a metal reinforcement of the elastomeric component so as to cover its free surfaces, which are exposed to the ambient air, and/or at least one deflector sheltering, at least partially, a laminated part of the elastomeric component from the relative wind in order to reduce forced convection.

26 Claims, 9 Drawing Sheets

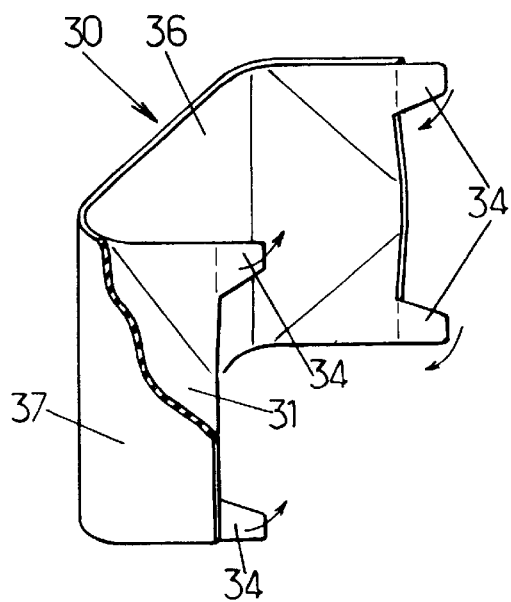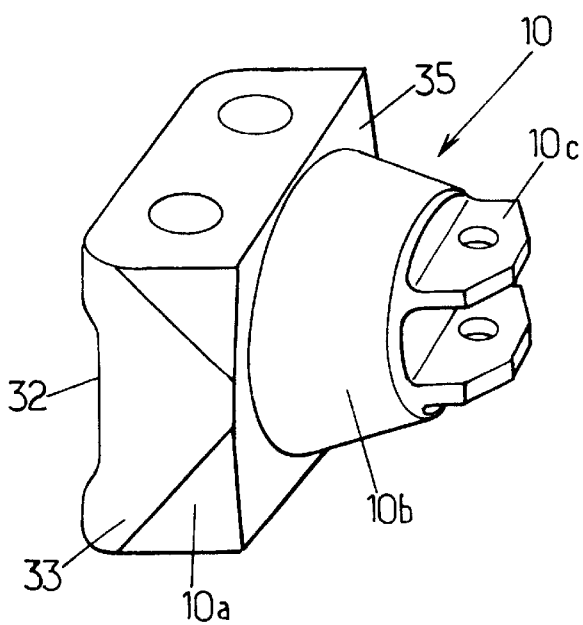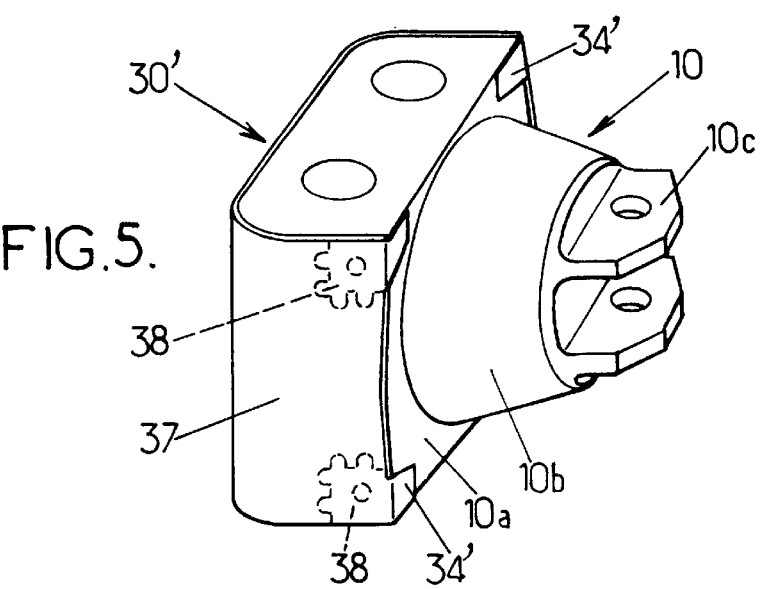

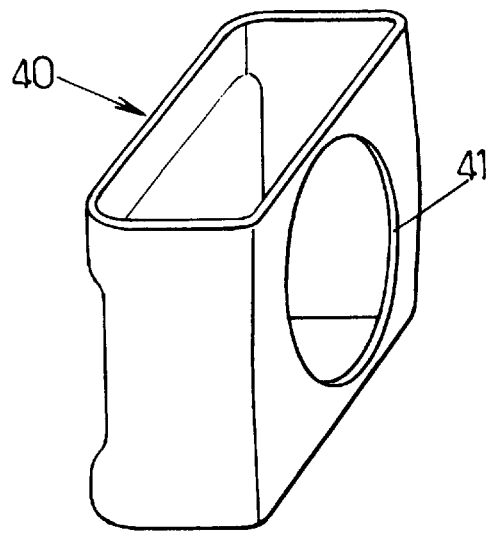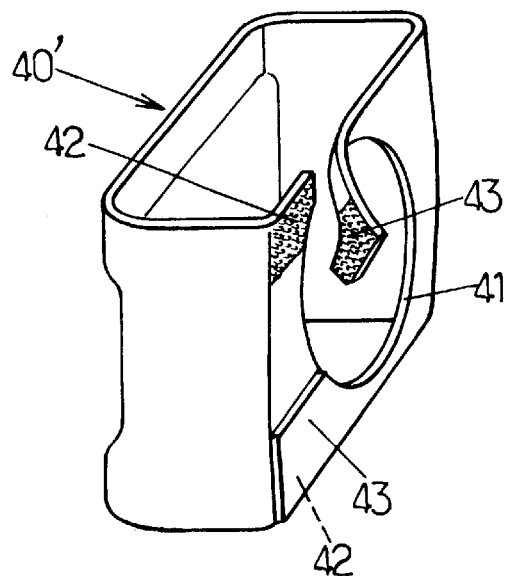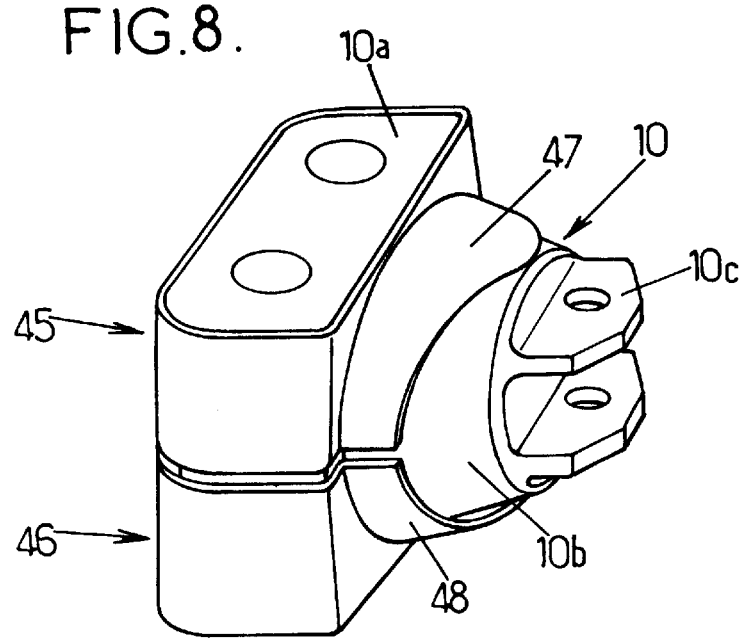

DEVICE FOR THERMALLY PROTECTING ELASTOMERIC COMPONENTS, SYSTEM OF SUCH DEVICES FOR THE PROTECTION OF A ROTORCRAFT ROTOR IN COLD WEATHER, AND ROTORCRAFT ROTOR EQUIPPED WITH SUCH A SYSTEM

The invention relates to a device for thermally protecting at least one elastomeric component, i.e. a component comprising at least one elastomer layer between two rigid metal reinforcements, and the invention also relates to a system of such thermal protection devices for the protection, in cold weather, of elastomeric components of a rotorcraft rotor, of the type comprising:

a hub, rotationally integral with a mast about a rotation axis of the rotor, at least two blades, each of which is fastened and hinged to the hub by a root-fitting part, and, for each blade, at least one elastomeric component, of the aforementioned type, one of the reinforcements of which is connected to said blade and the other reinforcement to one of two other components of the rotor, which are the hub and another blade of the rotor.

The invention also relates to a rotorcraft rotor, in particular a helicopter main or tail rotor, of the type mentioned above and equipped with a system for protecting its elastomeric components in cold weather, the system comprising thermal protection devices according to the invention.

Among the rotorcraft rotors of the aforementioned type, there are known, especially from EP-A-0,340,095 and FR-A-2,671,049, helicopter main or tail rotors in which, for each blade, a laminated elastomeric component, called a laminated spherical thrust bearing, provides the fastening and hinging of the blade to the hub of the rotor, and comprises a central part, consisting of an alternating stack of elastomer layers and of rigid cups, in the form of spherical caps, between, with respect to the axis of the rotor, an outer radial reinforcement, which is fastened to the hub, and an inner radial reinforcement, which is fastened to the root-fitting part of the corresponding blade.

Whether the rotor is of the type hinged by means of laminated spherical thrust bearings, as mentioned above, or of one of the two other types of rotors possible, namely rotors in which the blades are hinged to the hub by batteries of bearings, these rotors having the drawback of being heavy and requiring significant maintenance, or hingeless hub rotors, in which rotors, for each blade, at least one leaf provides both the take-up of the centrifugal force and the three degrees of freedom of the blade, in terms of pitch, flap and drag, and which, taking into account the dimensions, are currently limited to small helicopters, the rotor may comprise, for each blade, another laminated elastomeric component which is a drag absorber, also called a damper bridge.

These drag absorbers may, optionally, combine hydraulic damping means with a laminated structure having at least one elastomer layer between two rigid, generally metal, reinforcements, one of which is hinged to the root of the corresponding blade or to a connecting component, generally called a sleeve, which connects the root of the corresponding blade to the means of fastening and of hinging to the hub, and the other reinforcement of which is hinged either to the hub or to the root of an adjacent blade or to the corresponding connecting component when, in the latter case, the drag absorbers are mounted as inter-blade struts.

In these drag absorbers, the laminated parts with one or more elastomer layers generally have one of the two following structures. The elastomer layer or layers is or are strips, each adhesively bonded between two plate-shaped reinforcements, or each elastomer layer is tubular and adhesively bonded between an inner reinforcement and a likewise tubular outer reinforcement. In both cases, the elastomer is stressed in shear by the relative movements of the two reinforcements, each hinged, respectively, to one of two components of the rotor, namely two adjacent blades or one blade and the hub, the relative drag movements of which have to be damped.

When each blade is fastened and hinged to the hub by a laminated spherical thrust bearing, the elastomer layers of the central part of this thrust bearing are also stressed in shear by the pitch, flap and drag movements transmitted by the blade to the inner radial reinforcement of this thrust bearing, the outer radial reinforcement of which is fastened to the hub. However, the elastomer layers are also stressed in compression by the centrifugal forces which are exerted on the blade when the rotor is rotating. In operation, this elastomer is therefore stressed dynamically at the rotation frequency of the rotor in flap, drag and, above all, pitch. This excitation produces internal heating, due to the damping of the elastomer, which heats the laminated spherical thrust bearing. However, its metal reinforcements, generally made of aluminium, and in particular the inner radial reinforcement, which is the more voluminous, act as a radiator, limiting this heating effect by heat loss, by conduction from the laminated central part into the reinforcements and by forced convection with the ambient air at the free surfaces of the laminated central part and of the reinforcements.

This radiator effect of the reinforcements is beneficial in hot weather, but is problematic in cold weather (below −25° C.) as it limits the temperature rise of the laminated central part and does not make it possible to limit the stiffness of the elastomer layers of the laminated spherical thrust bearing in cold weather.

A drag absorber having the structure of a laminated elastomeric component has the same drawback, namely that its operation in cold weather may be limited by the stiffening of the elastomer.

This drawback is particularly marked for spherical laminated thrust bearings provided on rotors of helicopters having a single hydraulic circuit for the flight control servo. This is because the maximum cold (−40° C.) torsional stiffness imposed on such a spherical laminated thrust bearing must remain compatible with sufficient fatigue behaviour, and the stiffness must not exceed a certain value for fear of being unable to control the helicopter should the hydraulic servo provided by a single hydraulic circuit break down. Moreover, stiffening of the elastomer may cause problems in designing the control system, for example in order to avoid an excessively high loading of the bearing of a spider of a tail rotor, resulting from the cold stiffening of the elastomer of the laminated spherical thrust bearings for hinging the blades of this tail rotor.

In order to limit the cold stiffening of the elastomer of elastomeric components, several proposals have already been made: the simplest consists in adopting, for producing the reinforcements, a material having a lower thermal conductivity than aluminium or its alloys. The use of steel makes it possible to limit the removal of the heat dissipated in the elastomer, but it cannot be adopted because of the behaviour of the laminated elastomeric component in hot weather and because of the increase in mass which results therefrom. Another proposal consists in building in a system for heating the reinforcements of such elastomeric components, especially laminated spherical thrust bearings and damper bridges, but it is not applicable on low-tonnage helicopters because of the cost and the mass of such a system, although the problem of controllability in cold weather, because of the stiffening of the elastomer, does specifically arise in these small helicopters. It has also been proposed to optimize the properties of the elastomer, especially by increasing the loss angle of the material, in order to increase its heating effect. This is beneficial for decreasing the forces when designing the control system, but it cannot be applied to the main rotors for solving the controllability problem after a hydraulic servo breakdown since, although the modulus of the force decreases, the phase shift between the control force and the movement of the controlled components, namely the blades, increases with the loss angle of the elastomer, this being highly problematic for the pilot. Finally, it has been proposed to improve the modulus of elasticity/fatigue strength pair of the elastomer in order to be able to produce a laminated part of very small size while maintaining the mean time between removal or MTBR, but this improvement is very difficult to achieve and the reduction in the MTBR associated with a smaller laminated component cannot be envisaged as the lifetimes of the laminated elastomeric components are regarded as being too short, and considerable effort is expended in increasing them.

The problem underlying the invention is to limit the cold stiffening of the elastomeric, especially laminated, components used on the rotors of a rotorcraft, and in particular of the laminated spherical thrust bearings and the drag absorbers, without having the drawbacks of the proposals mentioned above, and therefore without having to create a new type of elastomeric component and without adversely affecting its behaviour in hot weather, while at the same time guaranteeing the safety which requires, on such laminated elastomeric components, the possibility of checking the condition of the laminated part during a pre-flight check.

Another object of the invention is to provide means which are inexpensive, simple to construct and simple to operate, making it possible to improve the use of the elastomeric components in cold weather and, in particular, to increase the field of use at low temperature of rotors which are equipped with elastomeric drag absorbers and/or are hinged by laminated spherical thrust bearings, and on which rotors these means allow the control forces to be decreased when there is a breakdown of the hydraulic servo for the flight controls in cold weather (down to −45° C.).

For this purpose, the invention provides a device for thermally protecting at least one elastomeric component, as defined hereinabove, of a rotorcraft rotor, of the aforementioned type, which device is characterized in that it comprises at least one element fitted onto the rotor so as to reduce the heat exchange between said elastomeric component and at least the ambient air.

The device, each element of which can be easily fitted onto the rotor and easily removed therefrom, is advantageously such that it comprises at least one thermally insulating element, comprising at least one layer of a thermal insulation material, and means for fitting it onto an elastomeric component so as to cover, at least partially, said elastomeric component and preferably so as to cover, at least partially, free surfaces of said elastomeric component which are exposed to the ambient air.

Such a thermally insulating element has the advantage of reducing heat exchange between the elastomeric component and the ambient air, and therefore of increasing the operating temperature of the elastomer which dissipates the energy by its damping, and consequently of reducing its stiffness in cold weather, while it can be easily removed from the rotor in hot weather so as then not to adversely affect the behaviour of the elastomeric component.

In a first embodiment, at least one thermally insulating element comprises a flexible sheath which is made of a thermal insulation material and which surrounds, at least partially, said elastomeric component. This sheath may be made of a thermal insulation material which is elastically deformable, so that the sheath is at least partially held against said elastomeric component by its intrinsic elasticity. However, alternatively or complementarily, the sheath may be provided with rapid opening and closing means, allowing it to be rapidly fitted onto said elastomeric component and rapidly removed therefrom, even when this elastomeric component is mounted in the flight configuration on the rotor. By way of example, the rapid opening and closing means may comprise a multiplicity of small hooks carried by at least one part of the sheath and engaging with a multiplicity of small loops also carried by at least one other part of the sheath, these means being of the type sold under the name "Velcro".

In a second embodiment, at least one thermally insulating element may comprise a thermal protection shroud with at least one layer of thermal insulation material, this layer being fastened to a rigid support provided with said means for fitting it onto an elastomeric component, these being removable fixing means that can be rapidly fitted and rapidly removed. In this case, the rigid support is advantageously shaped to the external shape of at least one part of said elastomeric component so as to surround, at least partially, said part of the elastomeric component when the shroud is fitted onto the latter by said removable fixing means. The rigid support may be made of sheet metal, having folding tabs constituting the removable fixing means, or a piece of rigid plastic with inserts extended, to the outside of the plastic piece, by folding tabs constituting these removable fixing means.

In these various embodiments, the thermal insulation material is advantageously a cellular or foamed material having a low thermal conduction coefficient.

Since the most thermally conductive and, usually, the most massive parts of an elastomeric component of the aforementioned type are its metal reinforcements, it is appropriate that at least one thermally insulating element of the device of the invention be fitted onto at least one reinforcement of the elastomeric component.

In particular, when the elastomeric component is a laminated spherical thrust bearing or a drag absorber, at least one of the reinforcements of which is, with respect to the axis of the rotor, an inner radial reinforcement, the device may comprise at least one thermal protection shroud shaped substantially in a "U" in order to surround, at least partially, said elastomeric component by the bottom of each "U"-shaped shroud bearing against said inner radial reinforcement.

As an alternative to at least one thermally insulating element, or preferably as a complement to this or these thermally insulating elements, the device of the invention may comprise one or more removable components which are fixed to the rotor by means that can be rapidly fitted and rapidly removed and are intended to reduce forced convection from one or more parts of the elastomeric component with the ambient air.

In particular, the device may comprise at least one cover which at least partially covers at least one elastomer layer of said elastomeric component so as to reduce forced convection with the ambient air. When the elastomeric component comprises at least one laminated part of alternately stacked elastomer layers and metal elements, the cover may surround, at least partially, this laminated part.

In the case of a laminated spherical thrust bearing, providing the fastening and hinging of a blade to the hub and having the aforementioned structure comprising a laminated central part between an inner radial reinforcement fastened to the root-fitting part of the blade and an outer radial reinforcement fastened to the hub, the device of the invention may comprise, on the one hand, at least one thermally insulating element which at least partially covers at least the inner radial face and the lateral faces of the inner radial reinforcement and, on the other hand, at least one cover which surrounds, at least partially, the laminated central part of the spherical thrust bearing.

If the thermally insulating element fitted onto the inner radial reinforcement is of the thermally protective shroud type, the latter may advantageously cover approximately the entire inner radial face and the lateral faces of this reinforcement and, in this case, a possible cover of the device is advantageously fitted, by removable fixing means that can be rapidly fitted and rapidly removed, either directly onto the root-fitting part of the blade, when this root-fitting part comprises, for example, a forked blade root directly connected to the inner radial reinforcement of the laminated spherical thrust bearing, or onto a component for connecting the blade to this inner radial reinforcement.

However, the latter may be protected by two thermally insulating elements consisting of flexible sheaths, each covering, at least partially, half of said inner radial face and said lateral faces of said inner radial reinforcement. In this case, it is advantageous for these two thermally insulating elements to be approximately mutually symmetrical and for each to have, respectively, one of two approximately mutually symmetrical covers so as to protect two approximately mutually symmetrical areas of said laminated part of said elastomeric component.

When the elastomeric member is a drag absorber with at least one tubular elastomer layer between an inner reinforcement and a tubular outer reinforcement, the device advantageously comprises at least one thermally insulating element, which is approximately tubular after it has been fitted, which surrounds, at least partly, the external surface of said tubular outer reinforcement. This approximately tubular thermally insulating element may consist of the combination of two "U"-shaped insulating shrouds, closed up against each other, around the drag absorber, or of one or more sheathes made of a thermally insulating material which are slipped or which close up as an insulating sleeve around the drag absorber, the external general shape of which is approximately cylindrical.

The thermal protection device of the invention may also comprise at least one relative wind deflector fitted onto the rotor by removable fixing means that can be rapidly fitted and rapidly removed, so as to limit, at least with respect to the rotation of the rotor, the speed of the ambient air in at least one region at least partially occupied by said elastomeric component. When the latter is a laminated spherical thrust bearing, at least one deflector is advantageously fastened to the hub, at least on one side of this thrust bearing.

According to the invention, the system for the protection of elastomeric components of a rotorcraft rotor in cold weather thus comprises, for each blade of the rotor, at least one thermal protection device as described above. The way in which this cold-weather protection system is fitted onto a helicopter rotor and removed therefrom makes it possible easily to switch from one of the two configurations of use of the rotor to the other, in cold weather and in hot weather, with the aid of simple, lightweight and inexpensive means, which make it possible to limit the cold stiffening of the elastomeric components, in particular of the laminated spherical thrust bearings and drag absorbers, by limiting heat exchange with the outside so as to increase the effects of the dissipation of energy produced by the elastomer on the operating temperature of the elastomeric component in question.

Other advantages and characteristics of the invention will emerge from the description given below, by way of non-limiting example, of embodiments described with reference to the appended drawings, in which:

FIGS. 3 and 4 illustrate diagrammatically in perspective, respectively, a laminated spherical thrust bearing of the rotor of FIGS. 1 and 2 and a shroud for thermally protecting this thrust bearing;

FIG. 5 illustrates the thrust bearing of FIG. 3 covered with an alternative form of the shroud of FIG. 4;

FIGS. 6 and 7 illustrate, in perspective, two embodiments of thermal protection sheaths made of a flexible and elastically deformable material;

FIG. 8 illustrates a thrust bearing according to FIG. 3, covered with two thermal protection sheaths in a third embodiment, each sheath with a deflection cover against forced convection with the ambient air;

Figure 1:
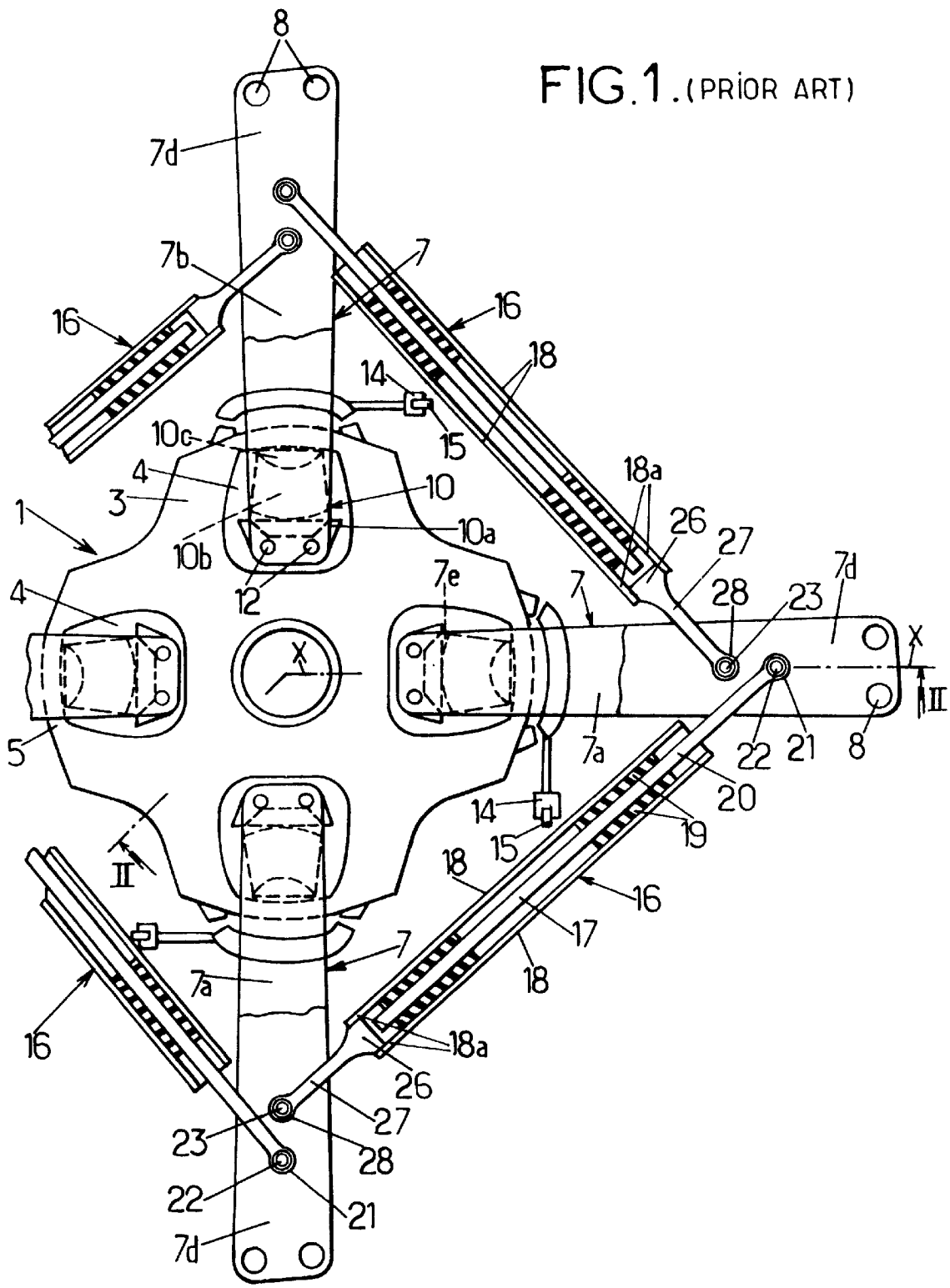
FIGS. 1 and 2 illustrate a head of a main rotor of a helicopter, diagrammatically and partially, respectively partly in plan and partly in cross-section perpendicular to the axis of the rotor in the case of FIG. 1 and in approximately radial cross-section and along the pitch axis of a blade in the case of FIG. 2.
Figure 2:
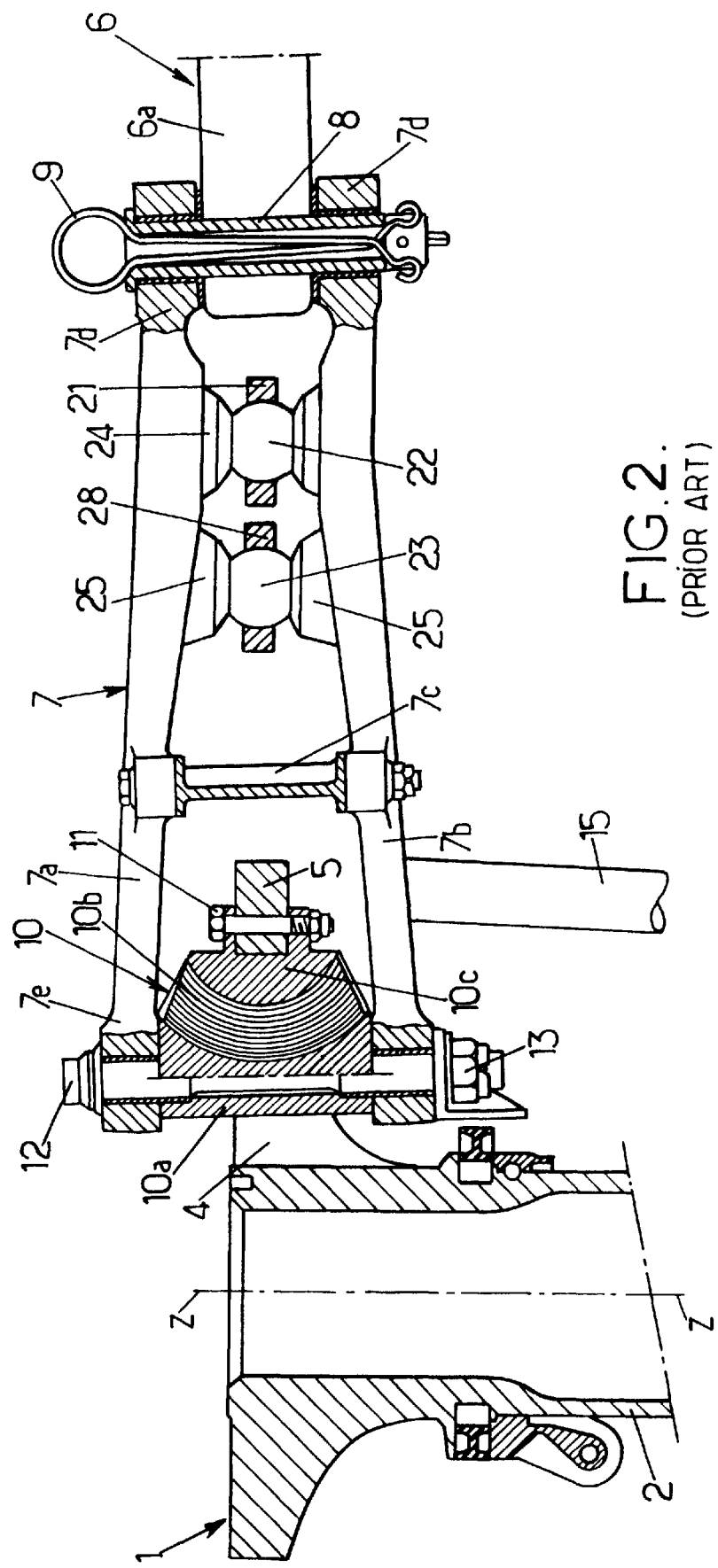

The head of the rotor in FIGS. 1 and 2 is of a type described in EP-A-0,340,095, to which reference may be made for further details about the structure of this rotor and for alternative embodiments described in the aforementioned patent, the description of which is incorporated in the present specification by way of reference.

It will be recalled that the rotor in FIGS. 1 and 2 comprises a hub 1 having a single plate approximately perpendicular to the rotation axis Z—Z of the rotor, which is the axis of a tubular rotor mast 2, rotationally driven about the Z—Z axis and with which the hub plate 1 is rotationally integral. For a four-bladed rotor, the plate 1 is approximately cruciform and has, in each of its arms 3, the same number of cut-outs or cavities 4 as there are blades, these cut-outs or cavities 4 being cut axially through the plate 1 and closed radially towards the outside by a slightly convex edge 5. Each of the blades 6 (see FIG. 2) is connected by its root 6a to the hub 1 by means of an approximately radial (with respect to the Z—Z axis) connecting component, called a sleeve 7 because its central part is generally tubular, but in this embodiment essentially consists of an upper plate 7a and a lower plate 7b which are held together, one vertically above the other, especially by a central brace 7c. The outer radial ends of the plates 7a and 7b of the sleeve 7 constitute an outer radial clevis 7d, the blade root 6a being held between the two arms of this clevis by two pins 8 which are parallel to each other, each pin passing through aligned bores in the blade root 6a and the arms of the outer clevis 7d, the two pins 8 lying on each side of the longitudinal pitch axis X—X of the corresponding blade 6 and each pin 8 being held in place by a resilient fixing pin 9.

The inner radial ends of the plates 7a and 7b of the sleeve 7 form an inner radial clevis 7e between the two arms of which is mounted, as a brace, the inner radial reinforcement 10a of a laminated spherical thrust bearing 10 constituting the single component providing both the fastening and hinging of the blade 6 and of its sleeve 7 to the hub 1, in a well-known manner.

The laminated spherical thrust bearing 10 includes a central part 10b which is laminated and consists of an alternating stack of elastomer layers and of metal cups made of stainless steel, in the form of spherical caps whose concavity faces radially outwards, this laminated central part 10b being adhesively bonded between the inner radial reinforcement 10a and an outer radial reinforcement 10c, which is shackled to the edge 5 of the corresponding cut-out 4 in the plate 1 in which the laminated spherical thrust bearing 10 is housed. This outer radial reinforcement 10c is fixed to the edge 5 by a bolt 11, while the inner radial reinforcement 10a is mounted as a brace between the arms of the inner clevis 7e of the sleeve 7, to which arms the inner radial reinforcement is fastened by two threaded studs 12 onto which nuts 13 are screwed.

The metal reinforcements 10a and 10c are usually made of aluminium or an aluminium alloy, the inner reinforcement 10a being the more massive.

The central brace 7c of the sleeve 7, fastened by bolts to the plates 7a and 7b, has, projecting laterally from one side of the pitch axis X—X of the corresponding blade, a pitch lever 14, the free end of which is shaped as a clevis in which is hinged the upper end of a pitch connecting rod 15 connected to a swashplate device (not illustrated) for controlling the pitch of the blades.

Each sleeve 7 is also connected to each of the two neighbouring sleeves 7 respectively by one of two drag absorbers 16, also called drag damper bridges or elastic drag struts with built-in damping, which are mounted as interblade struts surrounding the hub 1. Each of the absorbers 16, of which there are the same number as there are blades, is a laminated elastomeric component comprising an alternating stack of a central rigid plate 17 and of two outer rigid plates 18, which are made of metal, with two strips of viscoelastic elastomer 19, an eye-type end-fitting 20 extending the central plate 17, which constitutes a central reinforcement, at one end of the absorber 16, and a connecting clevis 18a extending the two outer plates 18, constituting an outer reinforcement, at the other end of the absorber 16. In order to mount each drag absorber 16 on two neighbouring sleeves 7, a swivel-joint eye 21 on the end of the end-fitting 20 is mounted directly around one 22 of two swivel joints 22 and 23 held in devises 24 and 25, respectively, these being axially offset along the pitch axis X—X and near each other between the two plates 7a and 7b of a sleeve 7, while the clevis 18a of the outer reinforcement 18, on the other end of the drag absorber 16, pivotally fastens a small connecting sleeve 26 to one end of a connecting arm 27, the other end of which has a swivel-joint eye 28 mounted directly around the second swivel joint 23 held in the corresponding clevis 25 of a neighbouring sleeve 7.

In such a rotor, and for each blade 6, the laminated spherical thrust bearing 10 connecting the blade and articulating it to the hub 1 and the drag absorbers 16 connecting it to the neighbouring blades are laminated elastomeric components, the elastomer layers of which are stressed in shear and, in the case of the thrust bearing 10, also in compression, when the rotor is operating.

In order to decrease the cold-weather stiffening of the elastomer, for the reasons mentioned above, without adversely affecting the hot-weather behaviour of these components 10 and 16, a thermal protection device is provided which is easy to fit and remove and which, when it is fitted to the rotor, makes it possible to reduce the heat exchange between these elastomeric components 10 and 16 and the ambient air, it being possible for this device to comprise at least one thermally insulating element which is fitted directly onto the elastomeric component in question, and/or at least one deflector, fitted onto a thermally insulating element or onto another component of the rotor, so as to limit the forced convection between the elastomeric component in question and the ambient air.

A first example of such a thermal protection device is illustrated in FIG. 4, in order to protect a laminated spherical thrust bearing 10 of the rotor in FIGS. 1 and 2, this thrust bearing being illustrated by itself in FIG. 3, and for which it is more crucial to limit the cold stiffening of the elastomer in its laminated central part 10b than in the case of a drag absorber 16.

The inner radial reinforcement 10a, which is massive and made of a metal or metal alloy which is a good heat conductor, receives, by conduction, the heat released in the laminated central part 10b by the work performed by the elastomer. In order to limit the heat losses by forced convection with the ambient air at the free surfaces of the reinforcement 10a, the device for thermally protecting the laminated thrust bearing 10 comprises a thermally insulating element illustrated in FIG. 4 and designed in the form of a thermally insulating shroud 30. This shroud 30 comprises a rigid support 31 made of stainless steel sheet which is cut and folded approximately into a "U" to the shape and size of the inner radial face 32 and of the two lateral faces 33 of this reinforcement 10a. The support 31 is extended at the four corners of the "U"-shaped folded sheet by four tabs 34 which may be folded down, by folding against the outer radial face 35 of the reinforcement 10a, after the shroud 30 has been placed over the inner radial face 32 and the lateral faces 33 of the reinforcement 10a. In order to protect the support 31 and the reinforcement 10a, a layer of a protective coating, for example a layer of impactresistant paint 36, is applied on the inner face of the "U"-shaped support 31. A layer 37 of a light and flexible thermal insulation material, for example a foamed or cellular material, is adhesively bonded to the outer face of the support 31. This material having a low thermal conductivity may be an elastically deformable synthetic material containing a large number of small air bubbles, such as the material sold under the trade name "Neoprene". The thermal protection shroud 30 may be held in place on the reinforcement 10a by means of the tabs 34 so as to cover its inner radial face 32 and its lateral faces 33 which are surfaces normally free and exposed to the ambient air. The folding tabs 34, which may also be covered with the insulating material 37 in order to protect those parts of the inner radial face 35 of the reinforcement 10a against which they are folded down, are removable fixing means that can be rapidly fitted and rapidly removed, which means ensure sufficient retention of the shroud 30 on the reinforcement 10a because of the fact that the centrifugal force, when the rotor is rotating, presses the bottom of the "U"-shaped shroud 30 against the inner radial face 32 of the reinforcement 10a which is thus well surrounded by the shroud 30, the rigid support 31 of which is shaped to the external shape of the free faces of the reinforcement 10a which are to be covered. The geometry of the shroud 30 and that of the cavities 4 which house the laminated spherical thrust bearings 10 in the hub plate 1 may be compatible with fitting the shroud 30 onto the inner reinforcement 10a of a thrust bearing 10 installed in the flight configuration.

In the alternative embodiment of the shroud 30' in FIG. 5, the rigid support is formed by a shaped injection-moulded plastic piece with stainless steel inserts 38 which are extended, to the outside of the plastic, by folding tabs 34' for fixing the shroud 30' onto the inner reinforcement 10a. As in the example in FIG. 4, a layer of a thermal insulation material 37 is fixed to the outer face of the support of the shroud 30'.

In the example in FIG. 6, the thermally insulating element is a flexible sheath 40 made of an insulating and elastically deformable material such as neoprene, this element being made as a single piece shaped in order to surround the inner radial face 32, the lateral faces 33 and the outer radial face 35 of the inner reinforcement 10a of the thrust bearing 10 in FIG. 3, the other faces, namely the upper and lower faces, of this reinforcement 10a having to remain free in order for the reinforcement 10a to be fixed between the arms of the inner clevis 7e of the sleeve 7 (see FIG. 2). The elasticity of the material of which the sheath 40 is composed allows this material to be held in contact with the faces that it covers and also makes it possible to deform the sheath 40 elastically in order to slip it onto the reinforcement 10a when the latter is no longer fitted as a brace between the two arms of the sleeve 7 when the thrust bearing 10 is fitted onto the hub 1 by its outer reinforcement 10c. The sheath 40 thus has the general shape of a sleeve of approximately rectangular cross-section, one long side of which has a circular opening 41 for passage of the laminated central part 10b of the thrust bearing 10.

In order for the sheath to be able to be fitted onto the inner reinforcement 10a and removed therefrom without involving any other piece of the hub and onto a thrust bearing 10 installed in the flight configuration, the alternative form of the sheath 40' in FIG. 7 has a sleeve structure which can open and close on its side with the circular opening 41 by the fact that this opening 41 is, on two opposite sides, bordered by two pairs of parts 42 and 43 of this face which are not integral with each other but which overlap and can be fastened and unfastened by the interaction of rapid opening and closing means of the type sold under the trade name "Velcro", using small hooks on one 42 of the two parts and small loops on the other part 43.

In the alternative embodiment in FIG. 8, the inner reinforcement 10a of the thrust bearing 10 is thermally insulated from the ambient air by two flexible sheaths 45 and 46, each made from the same insulating material as the sheaths 40 and 40' in FIGS. 6 and 7, these being approximately mutually symmetrical and each being shaped in the form of a sleeve corresponding approximately to one half of the sheath 40 in FIG. 6 so that each of the sheaths 45 and 46 covers approximately half the inner and outer radial faces and lateral faces of the reinforcement 10a, the sheath 45 covering the upper half and the sheath 46 the lower half in FIG. 8. Consequently, that part of the sheath 45 or 46 which covers an upper or lower half of the outer radial face 35 of the reinforcement 10a is a part cut out in the form of a semicircle, so that the two cut-outs of the two sheaths 45 and 46 in position on the reinforcement 10a substantially reconstitute the circular opening 41 of the sheath 40 in FIG. 6 for passage of the laminated central part 10b of the thrust bearing 10.

In order to limit the heat losses by forced convection at the external surface of the laminated central part 10b of the thrust bearing 10, which is in contact with the ambient air and swept by the relative wind when the rotor is rotating, a deflector 47 or 48 is added to each of the sheaths 45 and 46, which deflector is bent so as to be shaped to the shape of the external surface of the laminated central part 10b and thus constitutes a cover partially surrounding this laminated central part 10b. The two covers 47 and 48 are approximately mutually symmetrical and each is fastened to that part of the corresponding sheath 45 or 46 which covers the outer radial face 35 of the reinforcement 10a.

The thermal protection device therefore comprises two sheaths 45 and 46 with built-in deflecting covers 47 and 48, fitted as two symmetrical subassemblies so as to surround virtually all the free faces of the reinforcement 10a in contact with the ambient air as well as a large part of the external surface of the laminated central part 10b.

According to an alternative embodiment, not illustrated in the drawings, deflecting covers such as 47 and 48, for limiting the speed of the air in contact with the laminated central part 10b of the thrust bearing 10, may be combined with a shroud for thermally protecting the inner reinforcement 10a, such as the shrouds 30 and 30' in FIGS. 4 and 5. In this case, each of the covers is not fastened to the shroud 30 or 30' but is fixed by removable fixing means that can be rapidly fitted and removed, for example by screws, respectively on one of the two arms of the inner clevis 7e of the sleeve 7 for connecting the corresponding blade to the hub 1 (see FIG. 2). In particular, a cover such as 47 in FIG. 8 may be screwed against the lower face of the upper plate 7a of the sleeve 7, in line with the laminated central part 10b of the thrust bearing 10, the inner reinforcement 10a of which is protected by a shroud 30 or 30' of FIGS. 4 and 5 or by a flexible sheath 40 or 40' of FIGS. 6 and 7, while a cover such as 48 of FIG. 8 is screwed onto the upper face of the lower plate 7b of the sleeve 7, also in line with the laminated central part 10b of the thrust bearing 10.

Figure 9:
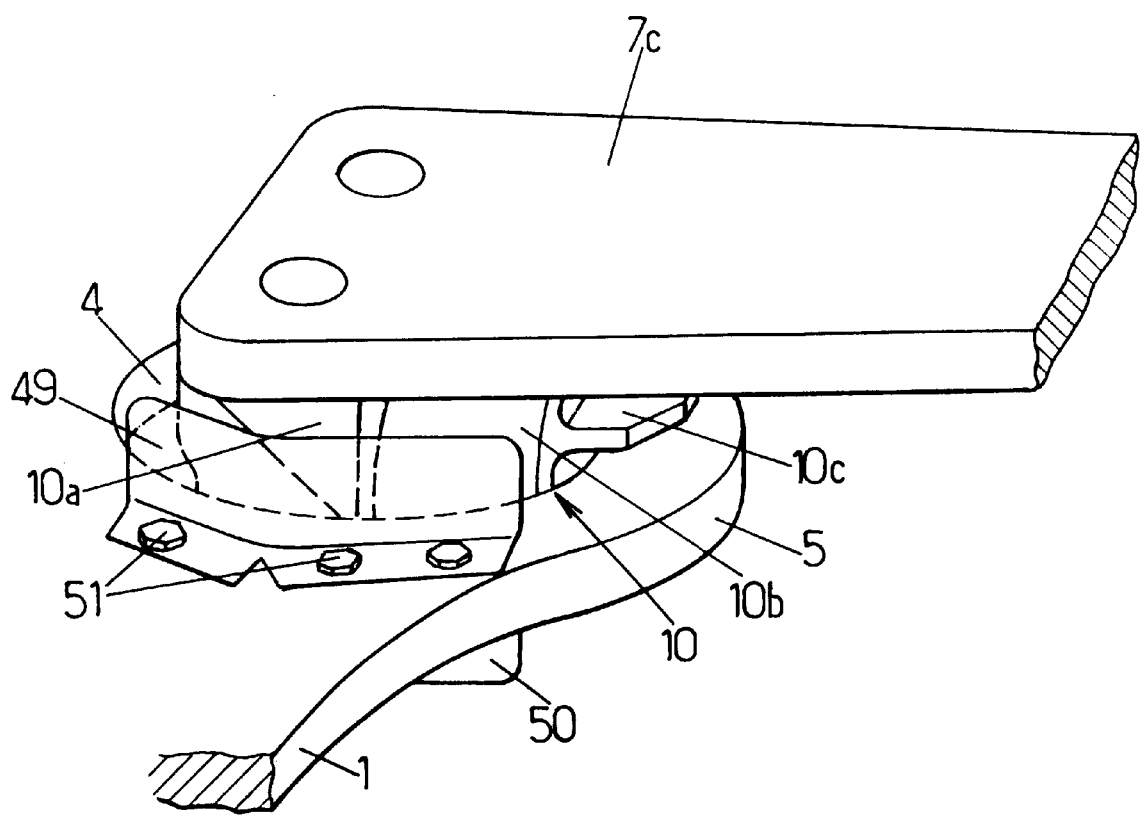
FIG. 9 illustrates diagrammatically, in perspective, deflectors for the complementary protection of the thrust bearing of FIG. 3 fitted onto the hub of the rotor of FIG. 2.

In addition to the thermally insulating elements arranged as a shroud 30 or 30', or as flexible sheaths 40, 40', 45 and 46, and deflecting covers 47 and 48 integrated into the sheaths such as 45 and 46 or attached to the blade/hub connecting sleeve 7, the thermal protection device may also include, as illustrated in FIG. 9, other deflectors 49 and 50 movably attached to the hub plate 1, at least on that side of the laminated spherical thrust bearing 10 which is turned towards the leading edge of the corresponding blade, in order to shelter the thrust bearing 10, and in particular its laminated central part 10b and its outer reinforcement 10c, from the relative wind, when the rotor is rotating, and in order to limit the speed of the ambient air in the region occupied by the laminated spherical thrust bearing 10. Each of the deflectors 49 and 50 may be slightly bent in order better to protect the thrust bearing 10 laterally, and the upper deflector 49 is removably fitted onto the upper face of the hub plate 1 by screws 51 on one side of the corresponding cavity 4 housing the thrust bearing 10, while the lower deflector 50 is similarly screwed up against the lower face of the plate 1 in a symmetrical position. Optionally, two deflectors such as 49 and 50 may be fixed to the hub 1, laterally on each side of each thrust bearing 10, in order to limit even further the forced convection at the free surfaces of each thrust bearing 10.

When the hub of the rotor is not a hub with a single cavitied plate, as in FIGS. 1 and 2, but a hub having two approximately mutually parallel plates perpendicular to the axis of the rotor and spaced apart along this axis in order to house the laminated spherical thrust bearings between them, each of which thrust bearings has its outer radial reinforcement fixed as a brace between the two hub plates, as illustrated in FIG. 9 in EP-A-0,340,095, the thermally insulating shrouds and sheaths and the deflecting covers described above with reference to FIGS. 4 to 8 may be used to protect the inner radial reinforcement of each laminated spherical thrust bearing since this reinforcement has approximately the same structure and the same shapes as the reinforcement 10a of the thrust bearing 10 in FIG. 3 and since it is fitted in the same manner as a rigid brace between the arms of an inner radial clevis of a blade/hub connecting sleeve. Deflectors such as 49 and 50 of FIG. 9 may also be used, but the upper deflector such as 49 is screwed onto the lower face of the upper hub plate and the lower deflector such as 50 is screwed onto the upper face of the lower hub plate. The two deflectors are therefore facing each other so as to make a screen protecting each laminated spherical thrust bearing from the relative wind.

On the other hand, on a rotor whose hub comprises two plates between which the outer reinforcement of each laminated spherical thrust bearing is held as a brace, if the connection between the inner radial reinforcement of each thrust bearing and the corresponding blade is not provided by a sleeve, the two arms of the inner clevis of which have openings for passage of the outer reinforcement, as in FIG. 9 of EP-A-0,340,095, but instead this connection is provided by a loop which surrounds the laminated spherical thrust bearing and in which the inner radial reinforcement of the latter is embedded, this loop emanating from the blade root or from a sleeve connecting the blade root by an outer clevis, as described in FR-A-2,671,049, the thermally insulating shrouds and sheaths described above with reference to FIGS. 4 to 8 are supplemented, in order also to cover the upper and lower faces of the inner reinforcement which are then free faces, and, optionally, these shrouds and sheaths are shaped in order also to surround that part of the connecting loop which surrounds this inner reinforcement. In order to make the fitting operation easier, it is then advantageous for the thermal protection device to comprise two approximately mutually symmetrical sheaths, such as the sheaths 45 and 46 of FIG. 8, but these are supplemented with, respectively, an upper and lower part so that each sheath has the shape of a fairing covering either the upper face or the lower face of the inner reinforcement as well as half of its other free faces. In an alternative embodiment, these two fairing-shaped sheaths may be designed so as not to cover that part of the loop surrounding the inner reinforcement. Of course, covers such as 47 and 48 of FIG. 8 may be built into the two fairing-shaped sheaths in order to protect the central part of the spherical thrust bearing, and deflectors such as 49 and 50 may be screwed on, respectively under the upper hub plate and on the lower hub plate, laterally on at least one side of each laminated spherical thrust bearing.

The thermal protection device of the invention may also comprise thermally insulating elements having the same structure as the shrouds 30 and 30' of FIGS. 4 and 5 or as the sheaths 40, 40', 45 and 46 of FIGS. 6 to 8, these shrouds and sheaths being optionally combined with deflecting covers such as 47 and 48 of FIG. 8 in order to protect the drag absorbers such as 16 in FIG. 1.

Figure 12:
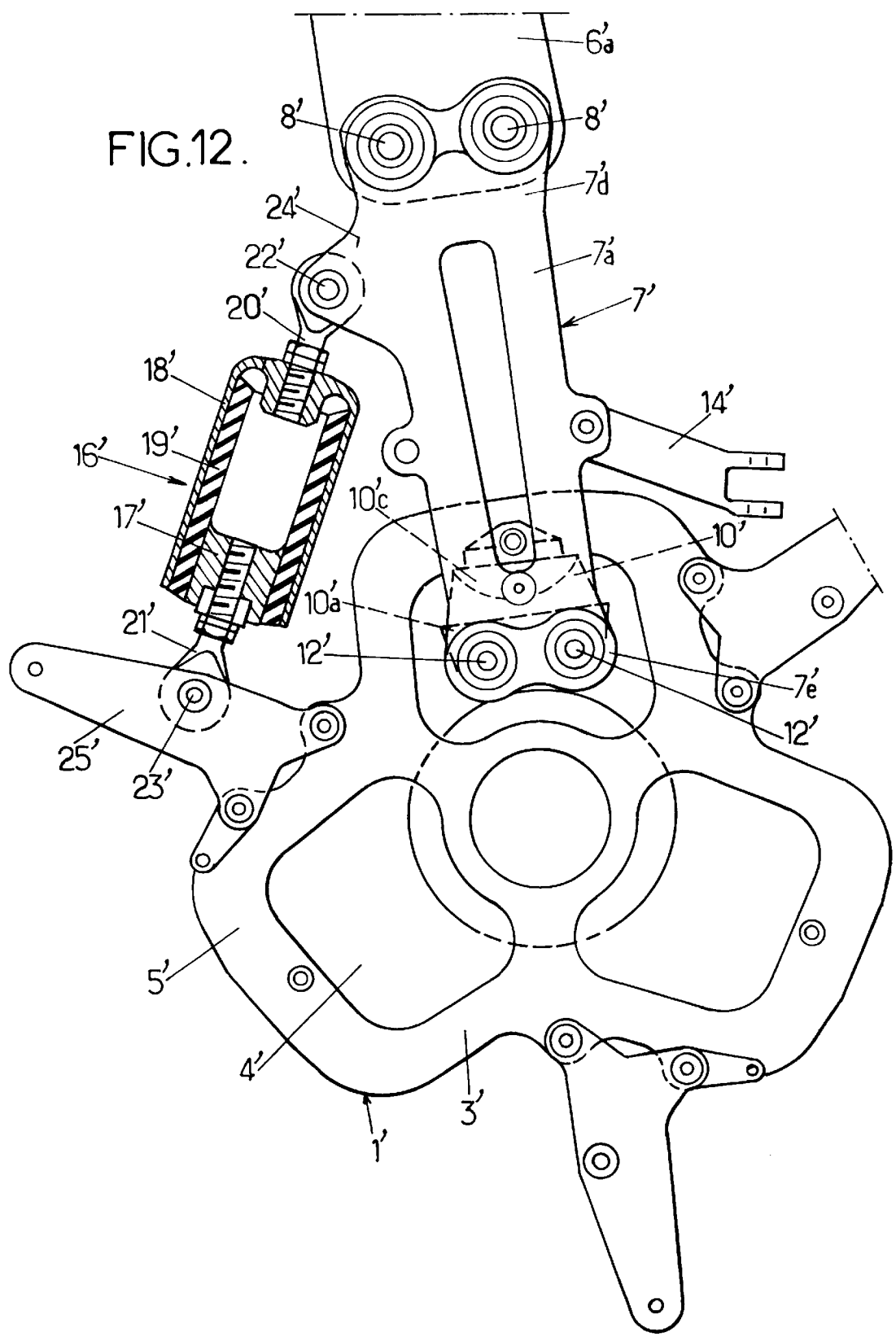
FIG. 12 is similar to FIG. 1 in the case of another helicopter rotor head with drag absorbers fitted between the blade sleeves and the hub, one of which has been illustrated in cross-section by its axis.

In FIG. 1, the drag absorbers 16 are mounted as inter-blade struts and each consists of an alternating stack of metal reinforcing plates 17 and 18, of elongate rectangular shape, and of rectangular strips of elastomer 19. However, in an alternative embodiment, as described in FR-A-2,671,049, and as on the three-blade main rotor head in FIG. 12, of the same hinged type as in FIGS. 1 and 2, with a hub plate 1' having cavities 4', each housing a laminated spherical thrust bearing 10', the outer reinforcement 10'c of which is fixed to the edge 5' of the corresponding cavity 4' and the inner reinforcement 10'a of which has been mounted as a brace in the inner clevis 7'e of a sleeve 7' for connecting, via its outer clevis 7'd, a blade root to the hub 1', and whose elements similar to those of the rotor in FIGS. 1 and 2 are identified by the same numerical references with the addition of a prime symbol, each drag absorber 16' may be hinged, at one end, by a swivel-joint end-fitting 21' to the hub 1', directly or indirectly, this being held by the corresponding swivel joint 23' in a clevis 25' fixed, so as to project laterally, to one side of the neighbouring hub arm 3', on the side opposite the pitch lever 14', and, at the other end, either directly to the blade, if the blade has a forked root 6'a by means of which the blade is connected to the inner radial reinforcement 10'a of the corresponding laminated spherical thrust bearing 10', or to the blade/hub connecting sleeve 7', as illustrated in FIG. 12, by means of a swivel-joint end-fitting 20', the swivel joint 22' of which is held in a clevis 24' which projects laterally from the sleeve 7' on the opposite side from the pitch lever 14'. Each drag absorber 16' may have a structure similar to that of the absorber 16 of FIG. 1, or another structure, as illustrated in cross-section in FIG. 12, and may include a tubular elastomer layer 19' adhesively bonded to and working in shear between an inner reinforcement 17' and a likewise tubular outer reinforcement 18', which are made of metal and into which are screwed, in an axially adjustable position, the swivel-joint end-fittings 21' and 20' respectively.

Figure 13:
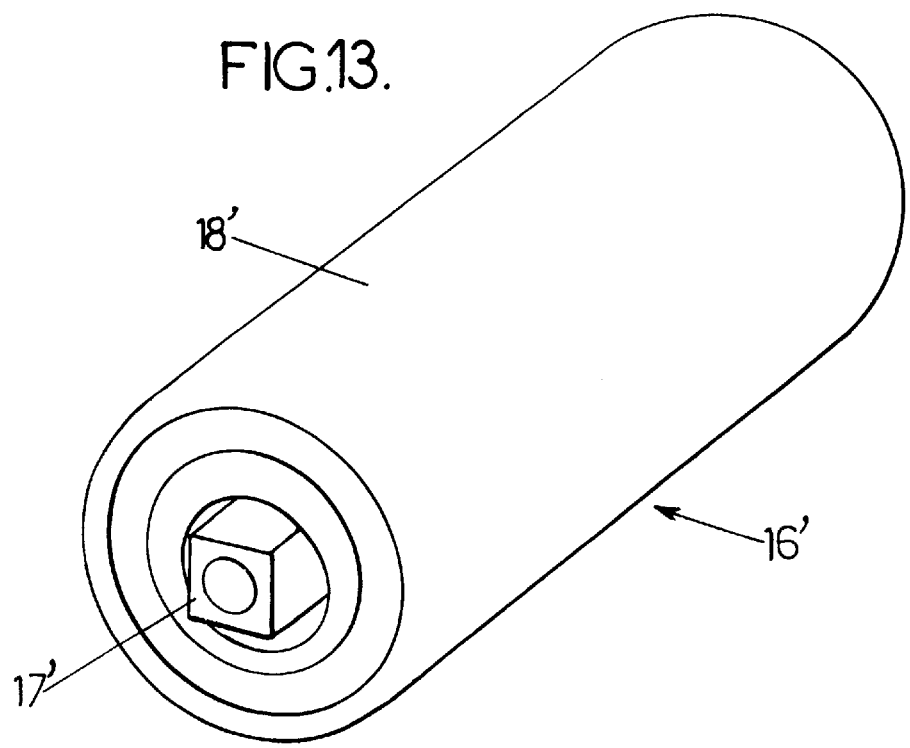
FIG. 13 is a perspective view of a drag absorber without thermal protection.

In these various structures and arrangements, each drag absorber, such as 16 or 16', has an external shape which is simpler than that of a laminated spherical thrust bearing 10 or 10' and is generally more easily accessible than the latter. This is because, the external shape of a drag absorber is either approximately that of an elongate parallelepiped of square or rectangular cross-section (see the absorber 16 in FIG. 1) or approximately that of a cylinder, as for the absorber 16' in FIG. 12, this absorber being illustrated by itself, without its swivel-joint end-fittings 20' and 21' in FIG. 13. It is therefore easy to cover it with an insulating sheath which is either slipped around the drag absorber 16 or 16' before it is mounted on the rotor or is wrapped around the drag absorber 16 or 16' in place on the rotor when the sheath is provided with hook-and-loop closure tabs of the Velcro type, for example, as illustrated in FIG. 14.

Figure 14:
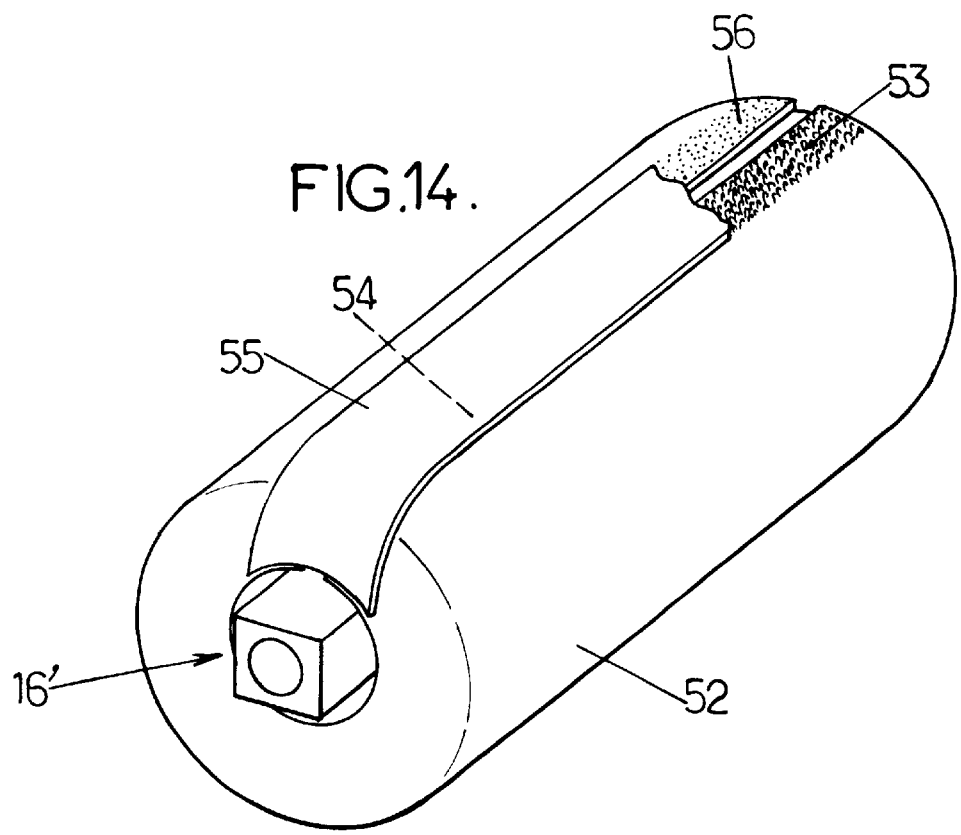
FIG. 14 is a view similar to FIG. 13 and with partial cut-away of the drag absorber covered with a removable thermal protection sheath.

In FIG. 14, the absorber 16' is enveloped in an insulating sheath 52, made of a flexible thermal insulation material, for example a synthetic flexible insulation material such as polychloroprene, which is wrapped around the external surface of the outer reinforcement 18' of the absorber 16', forming an insulating sleeve which leaves access, at the two axial ends of the sleeve, to the central parts of the reinforcements 17' and 18' in order to fix the swivel-joint end-fittings 20' and 21'. One longitudinal edge of the sheath 52, which when flat opens out approximately into a rectangle, has a part 53 of a rapid opening/closing removable fixing device of the "Velcro" (registered trade mark) type, for example the part having the loops, while the complementary part 54, provided with small hooks, is fixed under the free longitudinal edge of an approximately rectangular patch 55, the other longitudinal edge of which is adhesively bonded to the other longitudinal edge 56 of the sheath 52 so that, after the sheath 52 has been placed around the outer reinforcement 18' of the absorber 16', pressing the patch 55 down applies the two parts 54 and 53 of the fixing device against each other in order to fix the insulating sheath 52 around the absorber 16'.

The simple external shapes of the drag absorbers also allow each of them to be thermally protected by means of one or, preferably, two elongate insulating shrouds of "U"-shaped cross-section, substantially like the shrouds 30 and 30' of FIGS. 4 and 5, or, as required, with a rounded bottom, and allow these two shrouds to be closed up against each other so as to envelope the outer tubular reinforcement 18' of a drag absorber 16' of cylindrical shape or even a drag absorber 16 of parallelepipedal shape of FIG. 1.

Of course, the laminated spherical thrust bearing 10' of the rotor in FIG. 12 may be thermally protected as described above in the case of the thrust bearing 10 of the rotor in FIGS. 1 and 2.

Those skilled in the art may, without sucerfluous complementary explanation, easily design and/or shape the means of the thermal protection devices described above in the case of laminated spherical thrust bearings and in the case of one example of a cylindrical drag absorber in order for them to be suitable for laminated thrust bearings and drag absorbers which have other external shapes, without departing from the scope of the present invention.

The devices described above in the case of a main rotor are also suitable for a helicopter tail rotor for which the components termed "upper" or "lower" on a main rotor are, respectively, "outer" or "inner" components with respect to the rear structure of the helicopter on which the tail rotor is rotatably mounted.

Figure 10:
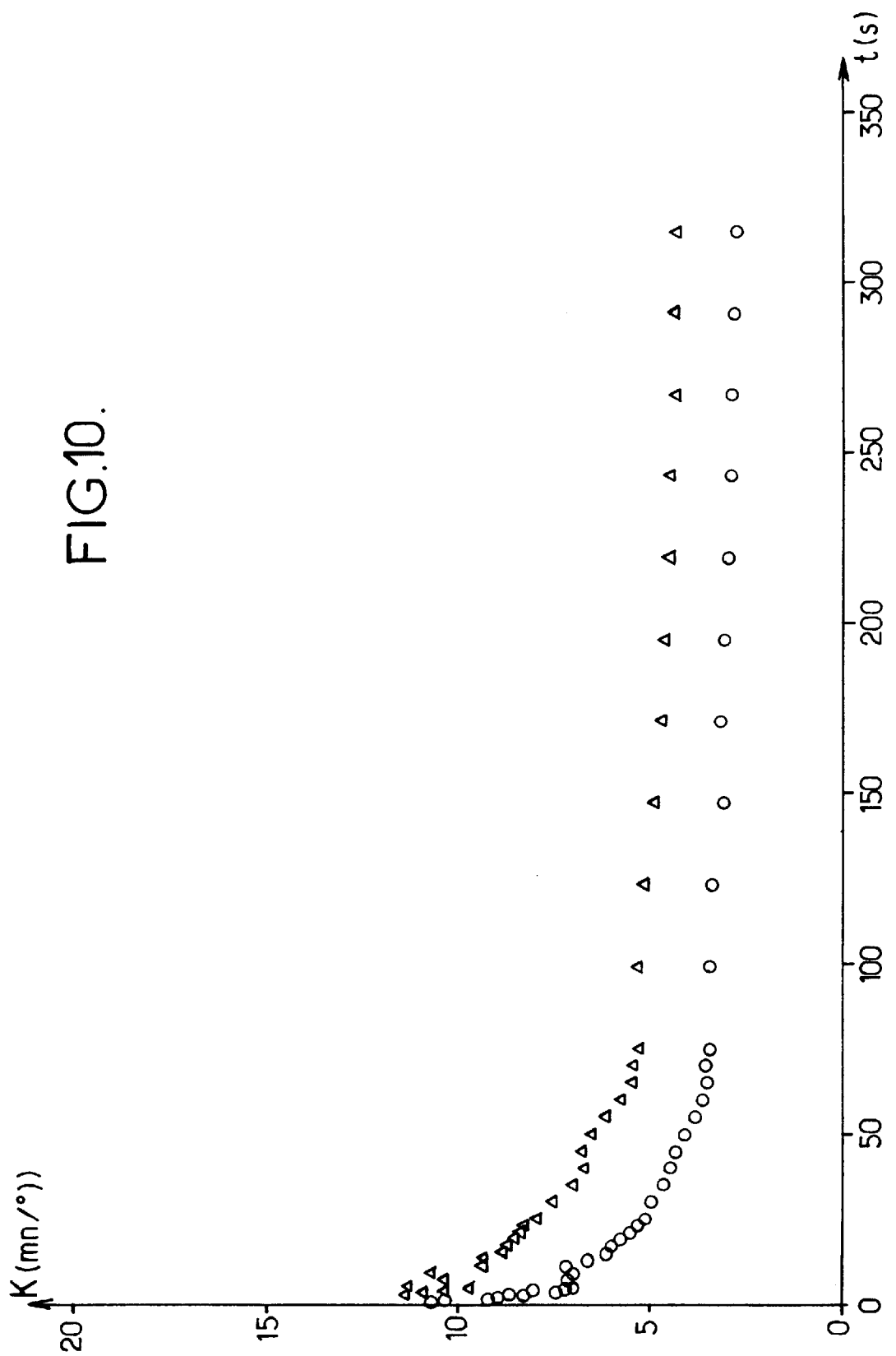
FIG. 10 shows curves of points indicating the torsional stiffness of a thrust bearing according to FIG. 3, with and without thermal protection by a sheath according to FIG. 6 or 7, as a function of time and in cold weather.

Plotted in FIG. 10 is the torsional stiffness "K" of a laminated spherical thrust bearing, such as that in FIG. 3, as a function of time "t" for an external temperature of −45° C., the thrust bearing being subjected to a relative wind of 20 m/s and a dynamic stress corresponding to a low cyclic pitch of ±5° at a frequency of 6 Hz, a first measurement being made without the protection of a sheath, such as the sheath 40 in FIG. 6, starting from a zero stress upon starting the rotor, and up to a time of about 300 s corresponding to the steady operating state of the thrust bearing, this first measurement corresponding to the points indicated by the triangles. A second measurement, identical to the first but with the inner radial reinforcement of the laminated spherical thrust bearing protected by the neoprene sheath 40 in FIG. 6, corresponds to the points indicated by the circles. The two curves joining up the two groups of points show the potential benefits, in terms of stiffness, that may be provided by an insulating sheath such as that in FIG. 6. These benefits are a decrease of approximately 30% in the steady-state stiffness (after 300 s) and a much healthier startup behaviour with the thermal protection, which provides a much more rapid decrease in the stiffness and therefore causes less damage to the laminated spherical thrust bearing, than without the thermal protection.

Figure 11:
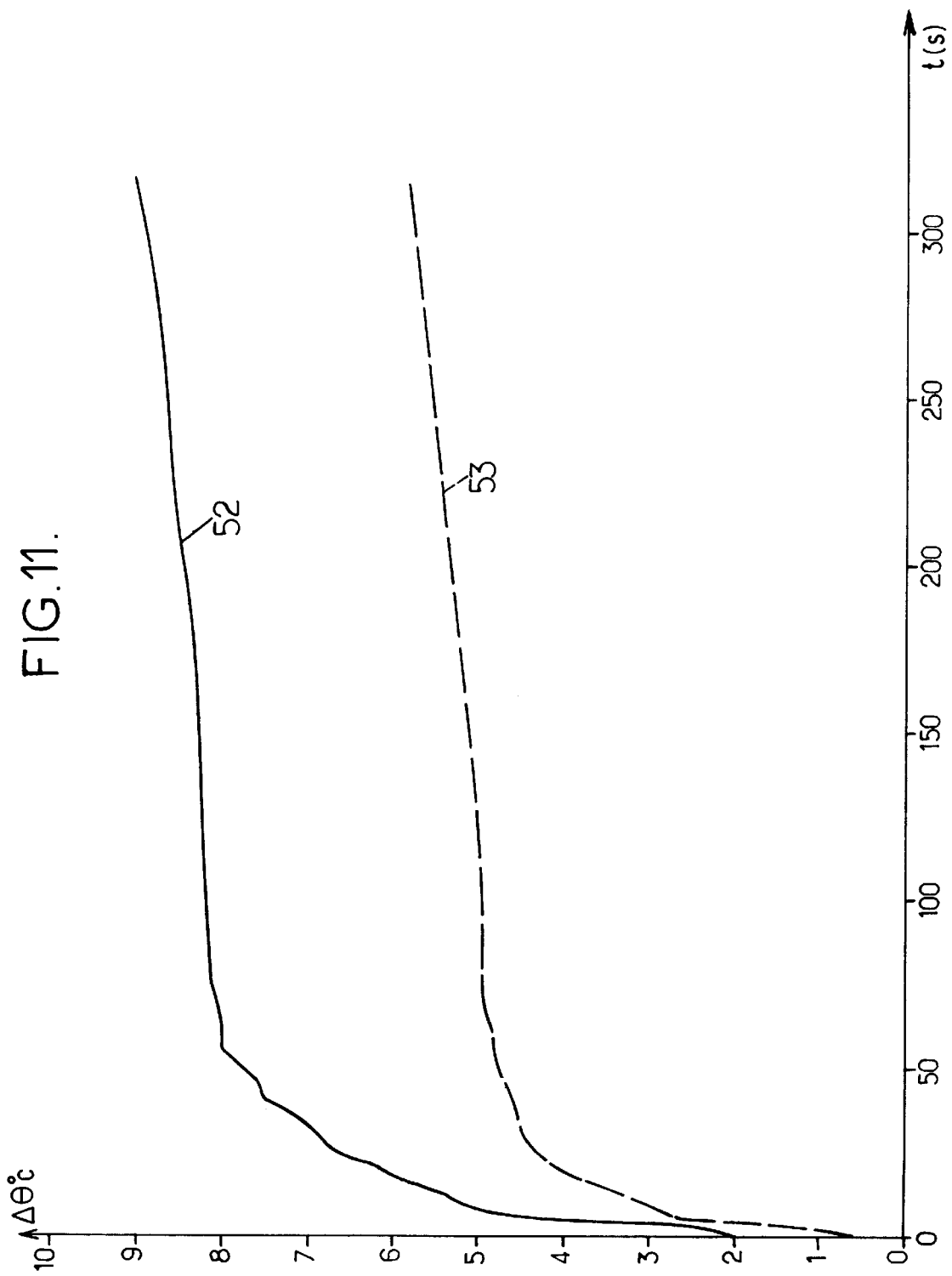
FIG. 11 shows two curves indicating the temperature difference with respect to cold ambient air as a function of time in an elastomer layer of the laminated spherical thrust bearing of FIG. 3, with and without thermal protection by a sheath according to FIG. 6 or 7.

FIG. 11 shows, for a point on an elastomer layer of the laminated central part 10b of the thrust bearing 10 in FIG. 3, which is close to the inner reinforcement 10a, the temperature difference between the temperature of the elastomer at this point and the ambient temperature as a function of time, with the protection of the sheath 40 in FIG. 6 in the case of the upper curve 52 and without this thermal protection in the case of the lower curve 53, the external temperature of the ambient air being −45° C. It may be seen that the elastomer works at a temperature of approximately −36° C. with the thermal protection, while it works at a temperature of approximately −39° C. without this protection. An increase of about 3 to 4° C. in this temperature range greatly reduces the stiffness since the elastomer has a high stiffness gradient in this temperature range.

The thermal protection devices according to the invention therefore provide a significant effect on the cold stiffening of the laminated elastomeric components whose use in cold weather may thus be improved by using the simple and inexpensive structural and operational means of the thermal protection devices of the invention. These devices make it possible to increase the field of use of hinged rotors with laminated spherical thrust bearings at low temperature by providing, in particular, a decrease in the control forces in the event of a breakdown in the hydraulic flight-control servo in cold weather on low-tonnage helicopters.

What is claimed is:

1. A device for thermally protecting at least one elastomeric component of a rotorcraft rotor, of the type comprising:

a hub, rotationally integral with a mast about a rotation axis of the rotor;

at least two blades, each of which is fastened and hinged to the hub by a root-fitting part, and, for each blade; and at least one elastomeric component comprising at least one elastomer layer between two rigid metal reinforcements, one of which is connected to said blade and the other to one of two other components of the rotor, which are the hub and another blade of the rotor, wherein the thermal protection device comprises, at least one element fitted onto the rotor so as to decrease the heat exchange between said elastomeric component and at least the ambient air, wherein the at least one element is at least one thermally insulating element having at least one layer of a thermal insulation material, and means for fitting said element onto an elastomeric component so as to at least partially cover said elastomeric component, the at least one thermally insulating element is fitted onto said elastomeric component so as to at least partially cover free surfaces of said elastomeric component which are exposed to the ambient air, and includes a flexible sheath which is made of a thermal insulation material and which at least partially surrounds said elastomeric component, said sheath is made of a thermal insulation material which is elastically deformable, so that the sheath is at least partially held against said elastomeric component by the intrinsic elasticity of said sheath.

2. Thermal protection device according to claim 1, wherein said thermal insulation material is a cellular or foamed material having a low thermal conduction coefficient.

3. Thermal protection device according to claim 1, wherein at least one thermally insulating element is fitted onto at least one reinforcement of said elastomeric component.

4. Thermal protection device according to claim 1, comprising at least one cover which at least partially covers at least one elastomer layer of said elastomeric component so as to reduce forced convection with the ambient air.

5. A device for thermally protecting at least one elastomeric component of a rotorcraft rotor, of the type comprising:
- a hub, rotationally integral with a mast about a rotation axis of the rotor;
- at least two blades, each of which is fastened and hinged to the hub by a root-fitting part, and, for each blade; and
- at least one elastomeric component comprising at least one elastomer layer between two rigid metal reinforcements, one of which is connected to said blade and the other to one of two other components of the rotor, which are the hub and another blade of the rotor, wherein the thermal protection device comprises, at least one element fitted onto the rotor so as to decrease the heat exchange between said elastomeric component and at least the ambient air, wherein the at least one element is at least one thermally insulating element having at least one layer of a thermal insulation material, and means for fitting said element onto an elastomeric component so as to at least partially cover said elastomeric component, the at least one thermally insulating element is fitted onto said elastomeric component so as to at least partially cover free surfaces of said elastomeric component which are exposed to the ambient air, and includes a flexible sheath which is made of a thermal insulation material and which at least partially surrounds said elastomeric component, the sheath is provided with rapid opening and closing means allowing said sheath to be rapidly fitted onto said elastomeric component and rapidly removed therefrom.

6. Thermal protection device according to claim 5, wherein said rapid opening and closing means comprise a multiplicity of small hooks carried by at least one part of the sheath and engaging with a multiplicity of small loops also carried by at least one other part of the sheath.

7. Thermal protection device according to claim 5, wherein said thermal insulation material is a cellular or foamed material having a low thermal conduction coefficient.

8. Thermal protection device according to claim 5, wherein at least one thermally insulating element is fitted onto at least one reinforcement of said elastomeric component.

9. Thermal protection device according to claim 5, comprising at least one cover which at least partially covers at least one elastomer layer of said elastomeric component so as to reduce forced convection with the ambient air.

10. Thermal protection device according to claim 5, wherein said elastomeric component is a drag absorber with at least one tubular elastomer layer between an inner reinforcement and a tubular outer reinforcement, said device comprising at least one thermally insulating element which is substantially tubular after said element has been fitted and which at least partly surrounds the external surface of said tubular outer reinforcement.

11. A device for thermally protecting at least one elastomeric component of a rotorcraft rotor, of the type comprising:
- a hub, rotationally integral with a mast about a rotation axis of the rotor;
- at least two blades, each of which is fastened and hinged to the hub by a root-fitting part, and, for each blade; and
- at least one elastomeric component comprising at least one elastomer layer between two rigid metal reinforcements, one of which is connected to said blade and the other to one of two other components of the rotor, which are the hub and another blade of the rotor, wherein the thermal protection device comprises, at least one element fitted onto the rotor so as to decrease the heat exchange between said elastomeric component and at least the ambient air, wherein the at least one element is at least one thermally insulating element having at least one layer of a thermal insulation material, and means for fitting said element onto an elastomeric component so as to at least partially cover said elastomeric component, the at least one thermally insulating element includes a thermal protection shroud with at least one layer of thermal insulation material, said layer being fastened to a rigid support provided with said means for fitting said layer onto an elastomeric component, said means being removable fixing means that can be rapidly fitted and rapidly removed.

12. Thermal protection device according to claim 11, wherein said rigid support is shaped to the external shape of at least one part of said elastomeric component so as to at least partially surround, said part of the elastomeric component when the shroud is fitted onto said component by said removable fixing means.

13. Thermal protection device according to claim 11, wherein said rigid support is made of sheet metal, having folding tabs constituting said removable fixing means.

14. Thermal protection device according to claim 11, wherein said rigid support is a piece of rigid plastic with inserts extended to the outside of said plastic piece by folding tabs constituting the removable fixing means.

15. Thermal protection device according to claim 11, wherein said thermal insulation material is a cellular or foamed material having a low thermal conduction coefficient.

16. Thermal protection device according to claim 11, wherein at least one thermally insulating element is fitted onto at least one reinforcement of said elastomeric component.

17. Thermal protection device according to claim 11, wherein said elastomeric component having, with respect to the axis of the rotor, an inner radial reinforcement, said device comprises at least one thermal protection shroud shaped substantially in a "U" in order to at least partially surround said elastomeric component by the bottom of each "U"— shaped shroud bearing against said inner radial reinforcement.

18. Thermal protection device according to claim 11, comprising at least one cover which at least partially covers at least one elastomer layer of said elastomeric component so as to reduce forced convection with the ambient air.

19. A device for thermally protecting at least one elastomeric component of a rotorcraft rotor, of the type comprising:
- a hub, rotationally integral with a mast about a rotation axis of the rotor;
- at least two blades, each of which is fastened and hinged to the hub by a root-fitting part, and, for each blade; and
- at least one elastomeric component comprising at least one elastomer layer between two rigid metal reinforcements, one of which is connected to said blade and the other to one of two other components of the rotor, which are the hub and another blade of the rotor, wherein the thermal protection device comprises, at least one element fitted onto the rotor so as to decrease the heat exchange between said elastomeric component and at least the ambient air, at least one cover which at least partially covers at least one elastomer layer of said elastomeric component so as to reduce forced convection with the ambient air, said elastomeric component includes at least one laminated part of elastomer layers and of metal elements and said cover at least partially surrounds said laminated part.

20. A device for thermally protecting at least one elastomeric component of a rotorcraft rotor, of the type comprising:

a hub, rotationally integral with a mast about a rotation axis of the rotor;

at least two blades, each of which is fastened and hinged to the hub by a root-fitting part, and, for each blade; and at least one elastomeric component comprising at least one elastomer layer between two rigid metal reinforcements, one of which is connected to said blade and the other to one of two other components of the rotor, which are the hub and another blade of the rotor, wherein the thermal protection device comprises, at least one element fitted onto the rotor so as to decrease the heat exchange between said elastomeric component and at least the ambient air, wherein the at least one element is at least one thermally insulating element having at least one layer of a thermal insulation material, and means for fitting said element onto an elastomeric component so as to at least partially cover said elastomeric component, the at least one thermally insulating element is fitted onto at least one reinforcement of said elastomeric component, said elastomeric component is a laminated spherical thrust bearing for fastening and hinging a blade to the hub and comprises, with respect to the axis of the rotor, an inner radial reinforcement fastened to the root-fitting part of said blade, at least one thermally insulating element of the device at least partially covers at least the inner radial face and the lateral faces of said inner radial reinforcement.

21. Thermal protection device according to claim 20, wherein a thermally insulating element is a thermal protection shroud which covers substantially the entire inner radial face and the lateral faces of said inner radial reinforcement of the laminated spherical thrust bearing.

22. Thermal protection device according to claim 21, wherein said laminated spherical thrust bearing has a laminated central part of elastomer layers alternately stacked with metal cups, said laminated central part being between the inner radial reinforcement and an outer radial reinforcement fastened to the hub, at least one cover of the device, which at least partially surrounds said laminated part, is mounted by removable fixing means that can be rapidly fitted onto, and rapidly removed from, said root-fitting part of the blade or a component for connecting said blade to said inner radial reinforcement.

23. Thermal protection device according to claim 20, wherein said inner radial reenforcement of the laminated spherical thrust bearing is protected by two thermally insulating elements made of flexible sheaths, each at least partially covering half of said inner radial face and said lateral faces of said inner radial reinforcement.

24. Thermal protection device according to claim 23, comprising two thermally insulating elements which are substantially mutually symmetrical, each having, respectively, one of two substantially mutually symmetrical covers so as to protect two substantially mutually symmetrical areas of said laminated part of said elastomeric component.

25. A device for thermally protecting at least one elastomeric component of a rotorcraft rotor, of the type comprising:

a hub, rotationally integral with a mast about a rotation axis of the rotor;

at least two blades, each of which is fastened and hinged to the hub by a root-fitting part, and, for each blade; and at least one elastomeric component comprising at least one elastomer layer between two rigid metal reinforcements, one of which is connected to said blade and the other to one of two other components of the rotor, which are the hub and another blade of the rotor, wherein the thermal protection device comprises, at least one element fitted onto the rotor so as to decrease the heat exchange between said elastomeric component and at least the ambient air, at least one relative wind deflector fitted onto the rotor by removable fixing means that can be rapidly fitted and rapidly removed, and so as to limit, at least when the rotor is rotating, the speed of the ambient air in at least one region at least partially occupied by said elastomeric component.

26. Thermal protection device according to claim 25, wherein said elastomeric component comprises a laminated spherical thrust bearing ensuring that a blade is fastened and hinged to the hub, at least one deflector of said device being fastened to the hub on at least one side of said laminated spherical thrust bearing.

* * * * *